United States Patent
Kagawa et al.

(10) Patent No.: US 8,294,955 B2
(45) Date of Patent: Oct. 23, 2012

(54) IMAGE READING APPARATUS, MULTIFUNCTION PRINTER APPARATUS, AND IMAGE PROCESSING METHOD

(75) Inventors: Hidetsugu Kagawa, Kawasaki (JP); Tohru Ikeda, Yokohama (JP); Takashi Nakamura, Yokohama (JP); Fumihiro Goto, Kawasaki (JP); Akitoshi Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 650 days.

(21) Appl. No.: 12/339,044

(22) Filed: Dec. 19, 2008

(65) Prior Publication Data

US 2009/0161139 A1  Jun. 25, 2009

(30) Foreign Application Priority Data

Dec. 21, 2007  (JP) ................. 2007-331069

(51) Int. Cl.
*G06T 5/00* (2006.01)
*H04N 1/407* (2006.01)
*H04N 1/409* (2006.01)

(52) U.S. Cl. ...... 358/3.27; 358/1.9; 358/3.21; 358/3.24; 358/3.26; 358/532; 382/254; 382/261; 382/263; 382/266

(58) Field of Classification Search ............ 358/1.9, 358/3.26, 3.27; 382/254–269
See application file for complete search history.

(56) References Cited

U.S. PATENT DOCUMENTS

| | | | |
|---|---|---|---|
| 5,036,186 A | 7/1991 | Tsao | |
| 5,377,025 A | 12/1994 | Spaulding et al. | |
| 5,539,541 A * | 7/1996 | Ushida | 358/530 |
| 5,687,006 A * | 11/1997 | Namizuka et al. | 358/462 |
| 5,689,590 A | 11/1997 | Shirasawa et al. | |
| 5,912,744 A * | 6/1999 | Nakane | 358/447 |
| 6,088,130 A | 7/2000 | Matsukubo | |
| 6,172,356 B1 | 1/2001 | Ogura et al. | |
| 6,233,060 B1 * | 5/2001 | Shu et al. | 358/1.9 |
| 6,290,318 B1 | 9/2001 | Yasukawa | |
| 6,323,957 B1 | 11/2001 | Ball | |
| 6,456,748 B1 * | 9/2002 | Yushiya et al. | 382/312 |
| 6,657,748 B1 | 12/2003 | Okita et al. | |
| 6,924,839 B2 * | 8/2005 | Eiho et al. | 348/252 |
| 6,967,605 B2 | 11/2005 | Fujihara et al. | |
| 6,972,877 B1 | 12/2005 | Nakamura | |
| 6,995,866 B2 | 2/2006 | Feng et al. | |
| 7,099,041 B1 | 8/2006 | Moriya et al. | |

(Continued)

FOREIGN PATENT DOCUMENTS

EP 1830380 A1 9/2007

(Continued)

*Primary Examiner* — King Poon
*Assistant Examiner* — Richard Zhu
(74) *Attorney, Agent, or Firm* — Canon USA Inc IP Division

(57) ABSTRACT

This invention is directed to provide a method capable of performing filter processing suitable for each of different image reading methods. This method includes the steps of causing a light emitting unit to sequentially irradiate an image original with light components of three primary colors and read the image original, and causing the light emitting unit to simultaneously irradiate the image original with one of three different color combinations, which includes two of the light components of three primary colors, and read the image original. The method further includes the step of processing image data obtained based on the reflected light received by the light receiving unit after changing a filter to be used for image processing depending on whether reading of the image original is primary color reading or complementary color reading.

6 Claims, 13 Drawing Sheets

U.S. PATENT DOCUMENTS

| | | |
|---|---|---|
| 7,119,934 B2 | 10/2006 | Yoshida et al. |
| 7,208,715 B2 * | 4/2007 | Kuan ......................... 250/208.1 |
| 7,224,494 B2 | 5/2007 | Saitou et al. |
| 7,627,189 B2 * | 12/2009 | Donomae et al. ............. 382/254 |
| 2003/0161007 A1 | 8/2003 | Maurer et al. |
| 2006/0077406 A1 | 4/2006 | Bhattacharjya |

FOREIGN PATENT DOCUMENTS

| | | |
|---|---|---|
| JP | 2004-013339 A | 1/2004 |
| JP | 2005-184390 | 7/2005 |
| JP | 2005-295153 | 10/2005 |
| JP | 3750429 | 3/2006 |
| JP | 2006-197531 | 7/2006 |

* cited by examiner

BEFORE FILTER PROCESSING

AFTER FILTER PROCESSING

FIG. 8

| 1 | 1 | 1 |
|---|---|---|
| 1 | 1 | 1 |
| 1 | 1 | 1 |

FIG. 9

| -1 | -1 | -1 |
|----|----|----|
| -1 | 9  | -1 |
| -1 | -1 | -1 |

FIG. 11

| -1 | -1 | -1 |
|----|----|----|
| -1 | 9  | -1 |
| -1 | -1 | -1 |

FIG. 12

| -1 | -2 | -1 |
|----|----|----|
| -2 | 13 | -2 |
| -1 | -2 | -1 |

IMAGE READING APPARATUS, MULTIFUNCTION PRINTER APPARATUS, AND IMAGE PROCESSING METHOD

BACKGROUND OF THE INVENTION

1. Field of the Invention

The present invention relates to an image reading apparatus, multifunction printer apparatus, and image processing method. Particularly, the present invention relates to an image reading apparatus, multifunction printer apparatus, and image processing method which correct density or brightness represented by image data obtained by optically reading an image original.

2. Description of the Related Art

A color scanner is known as an image reading apparatus which reads an image by switching light of different light emission wavelengths. Such a color scanner has a linear light source and an image sensor provided on a carriage movable in a predetermined direction. The light source includes LEDs capable of irradiating light emission wavelengths corresponding to three primary colors of light, that is, red (R), green (G), and blue (B). The carriage is moved in a direction (sub-scanning direction) perpendicular to the elongated direction (main scanning direction) of the linear light source. The liner image sensor receives reflected light obtained by irradiating an image original with light and reads the image original. To read the image original, a scanning read method is employed.

In the scanning read method, an original is read by switching three LEDs serving as a light source while conveying a CIS (Contact Image Sensor) unit in the sub-scanning direction. More specifically, the R component data of a color image is obtained by lighting a red LED. Next, the G component data is obtained by lighting a green LED. Finally, the B component data is obtained by lighting a blue LED. Image data of one line is obtained in one red, green, and blue LED lighting cycle. Image data of one page of the image original is obtained by repeating the lighting cycle while conveying the CIS unit in the sub-scanning direction.

In scanning read in which the red, green, and blue LEDs are sequentially turned on, color misalignment occurs. As a method of reducing color misalignment, a method of performing reading by turning on two LED light sources between charge readout timings is known, as disclosed in Japanese Patent Laid-Open No. 2005-184390.

If bright LEDs are used to improve the signal-to-noise ratio, the cost increases. To solve this problem, a method of reading an image by simultaneously turning on two LED light sources is known, as disclosed in Japanese Patent Laid-Open No. 2006-197531.

Alternatively, an image forming apparatus described in Japanese Patent No. 3,750,429 is known, which performs a reading operation appropriate for an original by switching illumination light in accordance with the original type such as a negative original or positive original.

FIG. 13 is a timing chart showing a primary color reading method of reading an image original by lighting only one color LED at a single timing.

As shown in FIG. 13, according to this method, the red (R), green (G), and blue (B) LEDs are sequentially turned on so that the respective color component data are output in synchronism with a pulse signal SH. When the red LED changes from ON to OFF, and the pulse signal SH is turned on, R component data is output. Similarly, when the green LED or blue LED changes from ON to OFF, and the pulse signal SH is turned on, G component data or B component data is output.

Let (R,G,B)=(255,255,255) be the brightness value of a read white original, and (R,G,B)=(0,255,255) be the brightness value of a read cyan original.

When an edge at which an original changes from white to cyan is read at the timing shown in FIG. 13, the output data of a line (a) is (R,G,B)=(255,255,255), and the output data of a line (b) is (R,G,B)=(0,255,255). In the line (a), at the light emission timing of the red LED, the original color is white. Hence, the brightness output value of the R component is 255. At the light emission timings of the green and blue LEDs, the original color is cyan. Hence, the brightness output value of the G component is 255. The brightness output value of the B component is also 255.

FIG. 14 is a timing chart showing a complementary color reading method of reading an image original by simultaneously turning on two color LEDs (simultaneously lighting two primary colors).

When an edge at which an original changes from white to cyan is read by the complementary color reading method at the timing shown in FIG. 13, the brightness output values are as follows. The output data of a line (c) is (RG,GB,BR)=(510,510,255), and the output data of a line (d) is (RG,GB,BR)=(255,510,255). The read data is converted into the brightness values of the R, G, and B color components by equation (1). In the line (c), (R,G,B)=(128,255,128). In the line (d), (R,G,B)=(0,255,255).

$$\begin{pmatrix} R \\ G \\ B \end{pmatrix} = \frac{1}{2} \begin{pmatrix} -1 & 1 & 1 \\ 1 & -1 & 1 \\ 1 & 1 & -1 \end{pmatrix} \begin{pmatrix} GB \\ BR \\ RG \end{pmatrix} \qquad (1)$$

Using the obtained values of the lines (a) to (d), a CTF (Contrast Transfer Function) is calculated by equation (2). In the primary color reading method, CTF=18%. In the complementary color reading method, CTF=7%.

$$CTF = \frac{W_p - B_p}{W_p + B_p} \cdot 100 \qquad (2)$$

Note that, in equation (2), $W_p$ is the maximum brightness, and $B_p$ is the minimum brightness.

As understood from a comparison between the calculated CTFs, the CTF value obtained by the complementary color reading method is smaller than that obtained by the primary color reading method. That is, if the complimentary reading method is employed, an image having a blurred edge is read. Since the reading method in the sub-scanning direction is different between the primary color reading method and the complementary color reading method, the CTF value readily changes at an edge portion in the sub-scanning direction.

The same as in image original reading by the method of simultaneously lighting two colors also applies to a two-color LED time-divisional lighting method as shown in FIG. 15.

As described above, in the above-described prior art, the reading reproducibility of an edge portion changes depending on the image original reading method such as primary color reading or complementary color reading.

In image original reading processing, conventionally, image processing including various kinds of filter processing is executed. In the above-described prior art, however, when different image reading methods such as the primary color reading method and the complementary color reading method are used, it is impossible to obtain an effect of improving the quality of a read image by single filter processing using a single filter set value.

SUMMARY OF THE INVENTION

Accordingly, the present invention is conceived as a response to the above-described disadvantages of the conventional art.

For example, an image reading apparatus, multifunction printer apparatus, and image processing method according to this invention are capable of performing filter processing suitable for each of different image reading methods.

According to one aspect of the present invention, there is provided an image reading apparatus which irradiates an image original with light, receives reflected light, and reads the image original based on the received light, the apparatus comprising: light emitting means for emitting light components of three primary colors; light receiving means for receiving the light reflected by the image original irradiated with the light emitting means; lighting control means for controlling the light emitting means to read the image original using one of primary color reading performed by causing the light emitting means to sequentially irradiate the image original with the light components of three primary colors and read the image original, and complementary color reading performed by causing the light emitting means to simultaneously irradiate the image original with one of three different color combinations, which includes two of the light components of three primary colors, and read the image original; and image processing means for processing image data obtained based on the reflected light received by the light receiving means after changing a filter to be used for image processing depending on whether reading of the image original is the primary color reading or the complementary color reading.

According to another aspect of the present invention, there is provided a multifunction printer comprising: the above described image reading apparatus; and print means for printing an image on a printing medium based on one of externally input image data and image data representing an image read by the image reading apparatus.

According to still another aspect of the present invention, there is provided an image processing method of causing light emitting means for emitting light components of three primary colors to irradiate an image original with light, causing light receiving means to receive reflected light, and processing image data obtained based on the received light, the method comprising: a primary color reading step of causing the light emitting means to sequentially irradiate the image original with the light components of three primary colors and read the image original; a complementary color reading step of causing the light emitting means to simultaneously irradiate the image original with one of three different color combinations, which includes two of the light components of three primary colors, and read the image original; and an image processing step of processing image data obtained based on the reflected light received by the light receiving means after changing a filter to be used for image processing depending on whether reading of the image original is primary color reading or complementary color reading.

The invention is particularly advantageous since image data obtained based on an image original is processed after changing a filter to be used for image processing depending on whether reading of the image original is primary color reading or complementary color reading, and filter processing suitable for each reading method is possible. This improves the quality of a read image.

Further features of the present invention will become apparent from the following description of exemplary embodiments (with reference to the attached drawings).

BRIEF DESCRIPTION OF THE DRAWINGS

FIG. 8 is a view showing an example of set values in the filter of a filter processing unit 640.

FIG. 9 is a view showing another example of set values in the filter of the filter processing unit 640.

FIG. 11 is a view showing filter set values applied to primary color reading.

FIG. 12 is a view showing filter set values applied to complementary color reading.

DESCRIPTION OF THE EMBODIMENTS

Figure 1A:
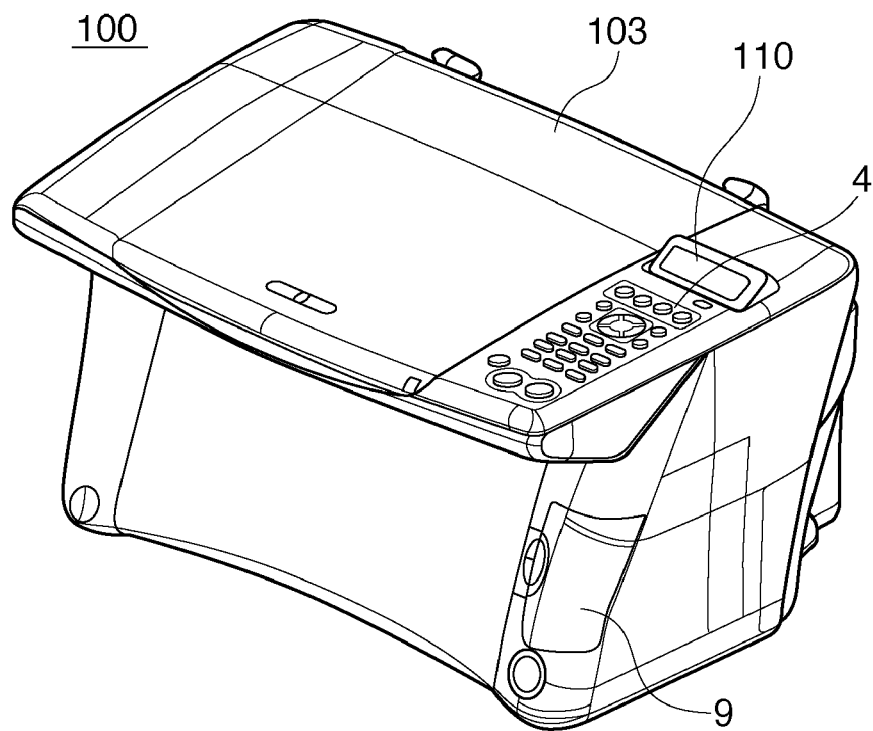
FIGS. 1A and 1B are perspective views showing the schematic arrangement of a multifunction printer (MFP) according to a typical embodiment of the present invention.

Exemplary embodiments of the present invention will now be described in detail in accordance with the accompanying drawings. The same reference numerals denote already described parts, and a repetitive description thereof will be omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Furthermore, unless otherwise stated, the term "printing element" generally means a set of a discharge orifice, a liquid channel connected to the orifice and an element to generate energy utilized for ink discharge.

The arrangement of a multifunction printer apparatus (to be referred to as an "MFP apparatus" hereinafter) will be described first.

<MFP Apparatus>

Figure 1B:
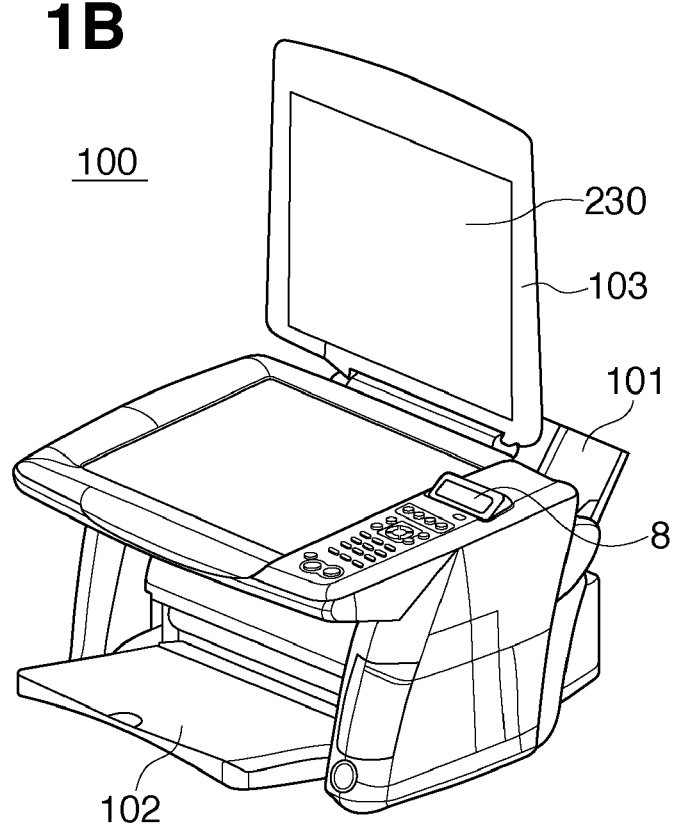

FIGS. 1A and 1B are perspective views showing the schematic arrangement of an MFP apparatus 100 according to a typical embodiment of the present invention.

The MFP apparatus can print an image on a printing medium such as a printing paper sheet based on image data from a connected host (not shown) or image data stored in a memory card, and also read and copy an image original.

FIG. 1A shows a state in which an original cover 103 is closed. FIG. 1B shows a state in which a printing medium tray 101, a discharge tray 102, and the original cover 103 are open.

A reading unit 8 including a CIS (Contact Image Sensor) unit reads an image original and outputs analog brightness signals of R, G, B components. A card interface 9 is used to receive a memory card in which image files taken by, for example, a digital still camera (not shown) are stored and read out image data from the memory card in accordance with a predetermined operation on an operation unit 4. The MFP apparatus 100 also includes a display unit such as an LCD 110. The LCD 110 is used to display contents set by the operation unit 4 or a function selection menu.

Figure 2:
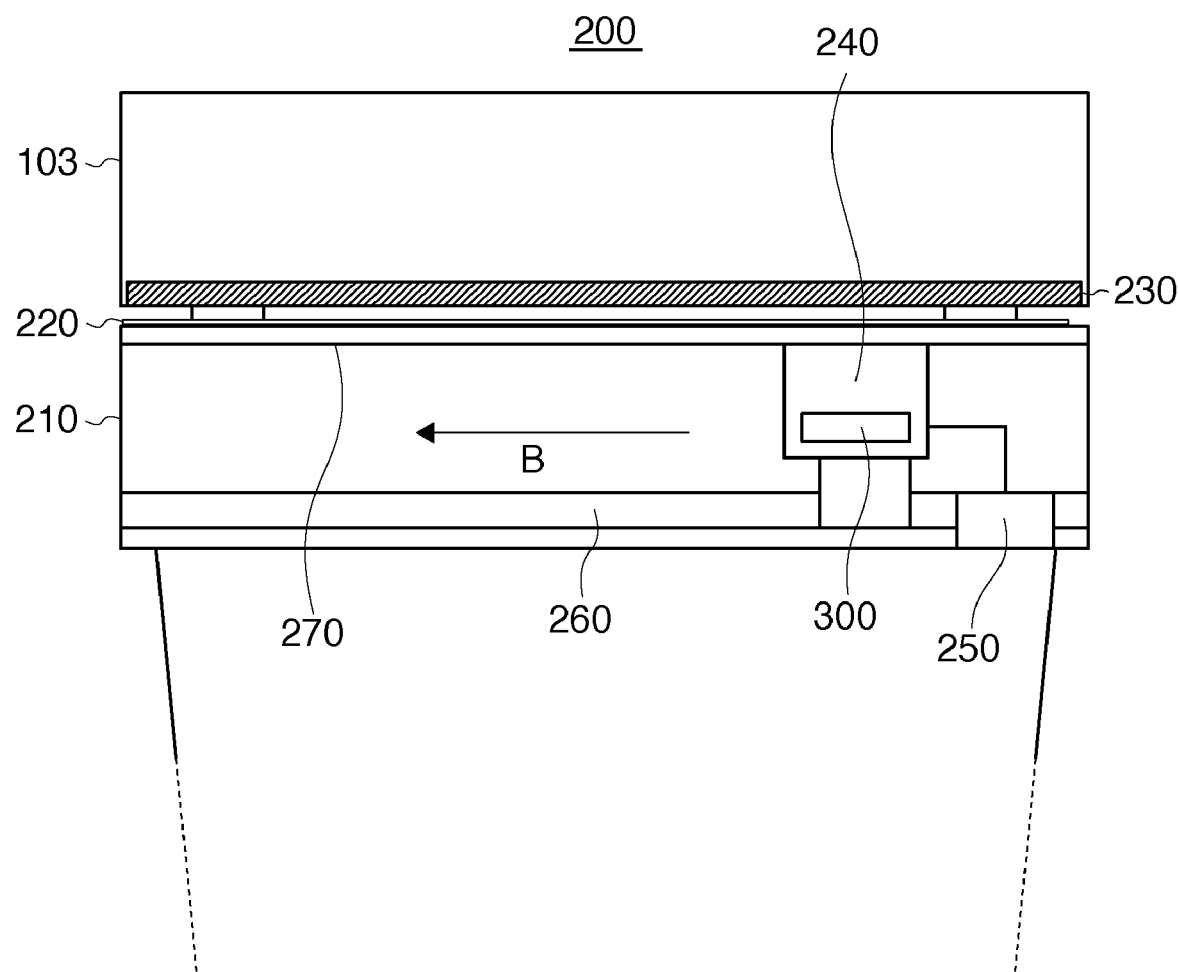
FIG. 2 is a sectional view of an image reading apparatus provided on the upper side of the MFP apparatus shown in FIGS. 1A and 1B.

FIG. 2 is a sectional view of an image reading apparatus provided on the upper side of the MFP apparatus shown in FIGS. 1A and 1B.

As shown in FIG. 2, an image reading apparatus 200 includes a main body 210 and a press plate 230 which presses an original 220 as a reading object and shields external light. The press plate 230 is set on the lower side of the original cover 103. The main body 210 includes an optical unit 240, a circuit board 250 electrically connected to the optical unit 240, a sliding rod 260 serving as a rail to scan the optical unit 240, and an original glass table 270. The optical unit 240 incorporates a CIS unit 300 which irradiates the original 220 with light, receives reflected light, and converts it into an electrical signal. In image reading, the optical unit 240 scans the original 220 placed on the original glass table 270 in the direction (sub-scanning direction) of an arrow B, thereby reading an image printed on the original 220.

Figure 3:
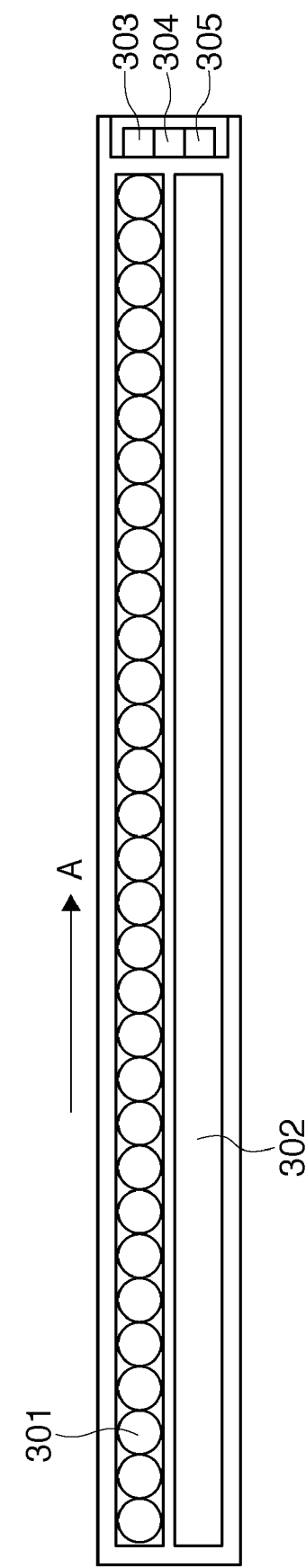
FIG. 3 is a side sectional view showing the detailed structure of a CIS (Contact Image Sensor) unit.

FIG. 3 is a side sectional view showing the detailed structure of the CIS unit 300.

As shown in FIG. 3, the CIS unit 300 includes a red LED 303 which emits red light, a green LED 304 which emits green light, and a blue LED 305 which emits blue light. In original reading, the respective color LEDs are time-divisionally turned on for each line. The original is uniformly irradiated with the emitted light via a light guide 302. A SELFOC® lens 301 condenses the reflected light for each pixel. An image of the light is formed on a photoelectric transducer (not shown) in the CIS unit so that the received light is converted into an electrical signal. An image signal of one line including R, G, and B color component signals is output in this way. The CIS unit 300 is moved in the sub-scanning direction, thereby reading the image all over the original. The direction of an arrow A which represents the cell array direction of the SELFOC® lens 301 is called a main scanning direction. The main scanning direction is perpendicular to the sub-scanning direction. In FIG. 2, the main scanning direction is perpendicular to the drawing surface.

Figure 4:
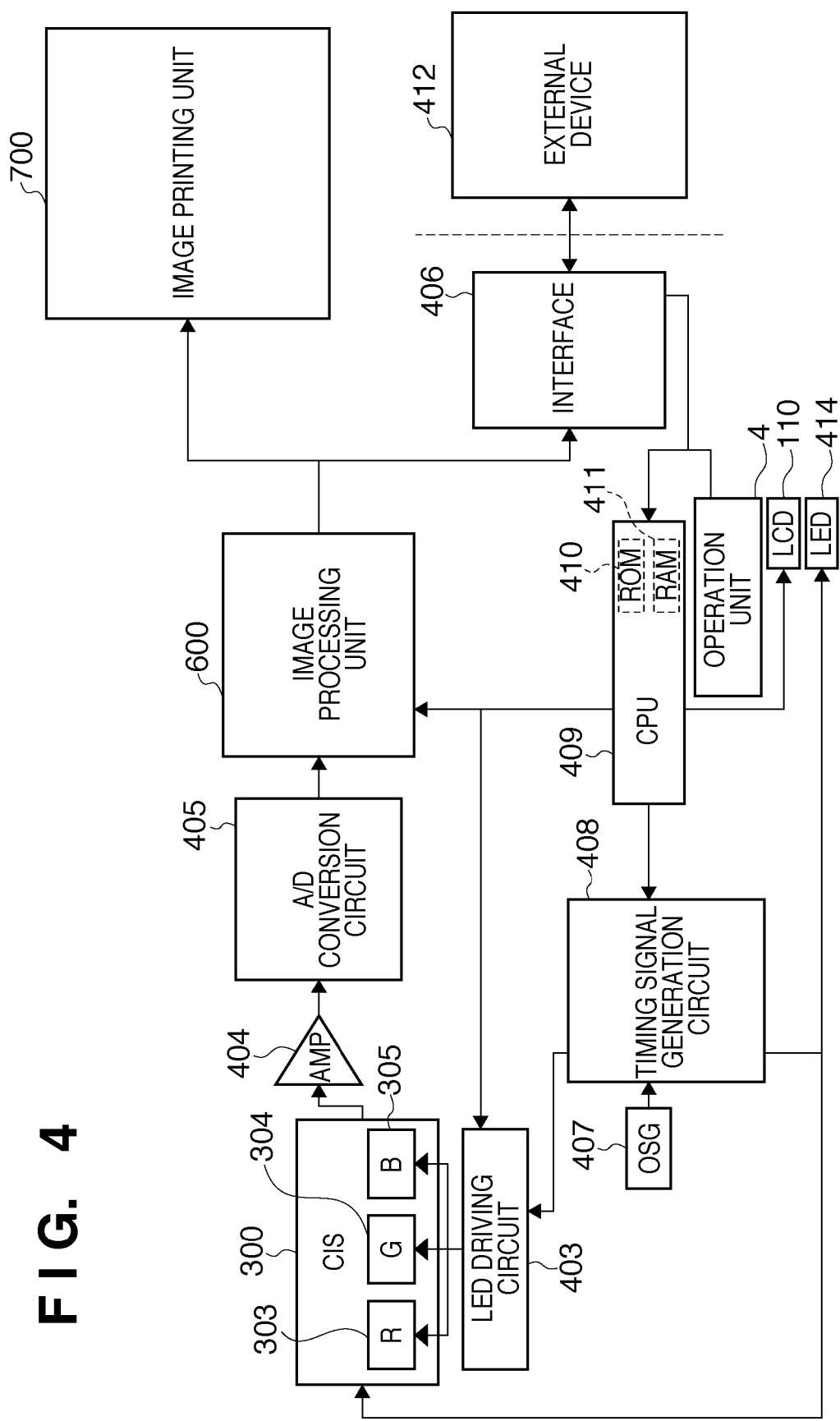
FIG. 4 is a block diagram showing the arrangement of the control circuit of the image reading apparatus.

FIG. 4 is a block diagram showing the arrangement of the control circuit of the image reading apparatus.

The same reference numerals as in FIGS. 1 to 3 denote already described constituent elements in FIG. 4, and a description thereof will not be repeated.

The CIS unit 300 line-sequentially reads a color image by causing an LED driving circuit 403 to selectively turn on the color LEDs 303 to 305 for each line. The LEDs 303 to 305 are light sources capable of changing the irradiation light amount on an original. The LED driving circuit 403 can arbitrarily turn on the LEDs 303 to 305.

More specifically, it is possible to sequentially turn on one or two of the LEDs 303 to 305 at a time or turn on all the three LEDs as needed. An amplifier (AMP) 404 amplifies the signal output from the CIS unit 300. An A/D conversion circuit 405 A/D-converts the amplified electrical signal and outputs, for example, 16-bit digital image data for each color component of each pixel. An image processing unit 600 processes the digital image data converted by the A/D conversion circuit 405. An interface control circuit (I/F) 406 reads out image data from the image processing unit 600 and transmits/receives control data to/from an external device 412 or outputs the image data. The image data from the image processing unit 600 can also be output to an image printing unit. The external device 412 is, for example, a personal computer (not shown).

An image printing unit 700 converts the image data from the interface control circuit 406 into binary data representing "print" or "not print" for each pixel and prints an image on a printing medium using printing materials. As the image printing unit 700, for example, an inkjet printer, a laser beam printer using an electrophotographic method, or a sublimation type printer is usable. These printers are known, and a detailed description thereof will be omitted.

The above-described series of processes is roughly classified into two types in accordance with the operation contents.

A copy or image reading (scanning) operation performed by the MFP apparatus alone will be described. In this case, the user of the apparatus inputs necessary instructions via the operation unit 4.

Figure 5:
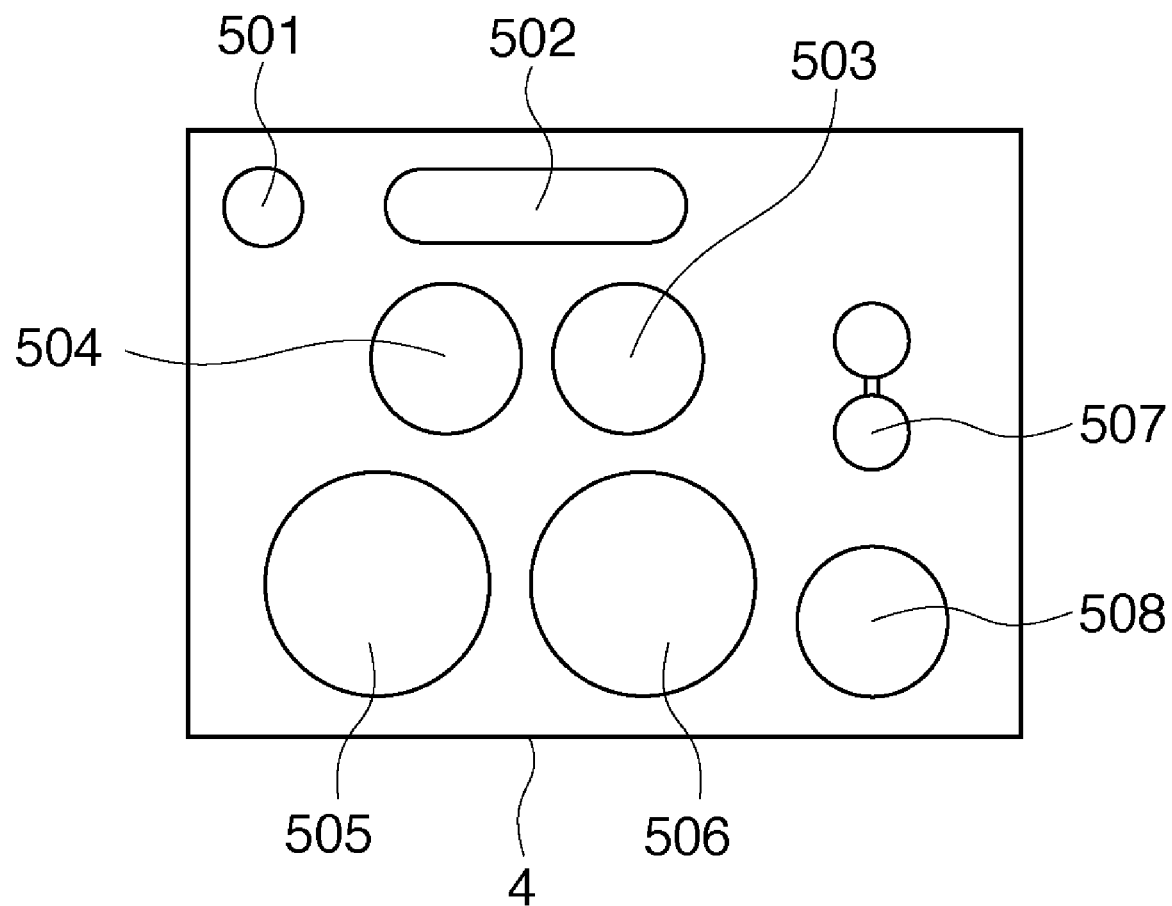
FIG. 5 is a view showing a detailed example of the arrangement of an operation unit.

FIG. 5 is a view showing a detailed example of the arrangement of the operation unit 4. The arrangement of the operation unit 4 will be described here with reference to FIG. 5.

The output signal from the operation unit 4 is connected to the input port of a CPU 409. A button 501 is a power key. A button 502 is a function selection button. Operable function contents are displayed on the LCD 110 in correspondence with the number of times the button 502 is pressed. Operations are set in accordance with the displayed function contents. When the user presses a determination button 503, the contents are set in a RAM 411. A button 504 is a cancel button. When the user presses a button 505, a color copy operation starts in accordance with the settings in the RAM 411. When the user presses a button 506, a monochrome copy operation starts in accordance with the settings in the RAM 411. The user presses a button 507 to designate the number of sheets or density. A button 508 is a reset button. The user can press the button 508 to cancel scanning or printing.

The description will be continued with reference to FIG. 4.

The above-described operation instruction from the operation unit 4 is controlled by the CPU 409 in the form of a microcomputer. The CPU 409 reads out a processing program ("control program 670" in FIG. 6 to be described later) stored in a ROM 410 and executes the control using the RAM 411 as a work area. Referring to FIG. 4, reference numeral 407 denotes a reference signal oscillator (OSC) such as a quartz oscillator, and reference numeral 408 denotes a timing signal generation circuit which divides the output of the reference signal oscillator 407 in accordance with the settings of the CPU 409 to generate various kinds of timing signals as the base of operations.

For an operation based on an instruction from a personal computer (external device 412), a copy or image reading (scanning) instruction is issued from the personal computer to the CPU 409. The operation from then on is the same as in the copy or image reading (scanning) operation performed by the MFP apparatus alone.

An LED 414 serves as the backlight source of the LCD 110 and is ON/OFF-controlled by a lighting signal output from the timing signal generation circuit 408.

Details of the image processing unit 600 will be described next.

Figure 6:
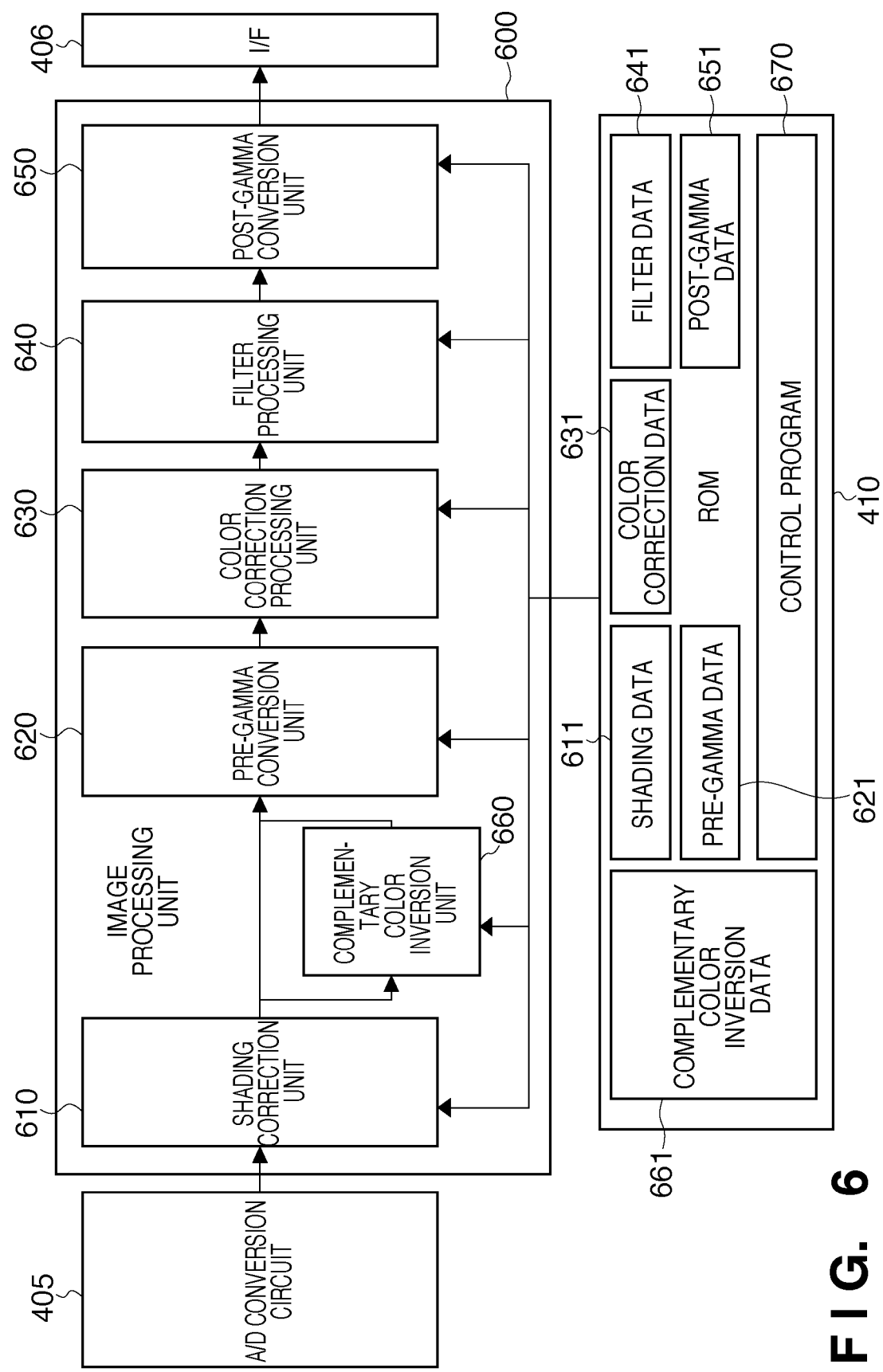
FIG. 6 is a block diagram showing the detailed arrangement of an image processing unit.

FIG. 6 is a block diagram showing the detailed arrangement of the image processing unit 600.

Digital image data converted by the A/D conversion circuit 405 is input to a shading correction unit 610. The shading correction unit 610 performs shading correction by reading a reference white board (not shown) bonded to the lower surface of an index plate (not shown) bonded to the original glass table 270 of the image reading apparatus 200.

Data used for the shading correction is shading data 611 stored in the ROM 410. The digital image data which has undergone the shading correction is input to a pre-gamma conversion unit 620. The pre-gamma conversion unit 620 performs gamma correction to obtain a visually preferable brightness distribution. Data used in the pre-gamma conversion unit 620 is pre-gamma data 621 stored in the ROM 410. The digital image data which has undergone the pre-gamma conversion is input to a color correction processing unit 630. The color correction processing unit 630 performs conversion processing to obtain preferable colors. Data used in the color correction processing unit 630 is color correction data 631 stored in the ROM 410.

The digital image data output from the color correction processing unit 630 is input to a filter processing unit 640. The filter processing unit 640 performs filter processing such as edge enhancement or noise reduction of the digital image data. Data used for the filter processing is filter data 641 stored in the ROM 410. The digital image data output from the filter processing unit 640 is input to a post-gamma conversion unit 650. The post-gamma conversion unit 650 fine-tunes the brightness characteristic of the received digital image data again in accordance with the application purpose. Data used in the post-gamma conversion unit 650 is post-gamma data 651 stored in the ROM 410. The digital image data output from the post-gamma conversion unit 650 is input to the interface control circuit (I/F) 406. Setting of these data from the ROM 410 to the respective processing units is implemented by causing the CPU 409 to read out and execute the contents of the control program 670.

A complementary color inversion unit 660 is an image processing unit which is used only when an instruction for complementary color reading is given. This processing is also controlled by the control program 670 stored in the ROM 410. Complementary color inversion data 661 stored in the ROM 410 is used for the processing. The control program also controls the operation of the LED driving circuit 403.

Filter processing executed by the MFP apparatus having the above-described arrangement will be described next in detail.

An explanation will be made assuming that the filter size of the filter processing unit 640 is 3×3 pixels.

Figure 7:
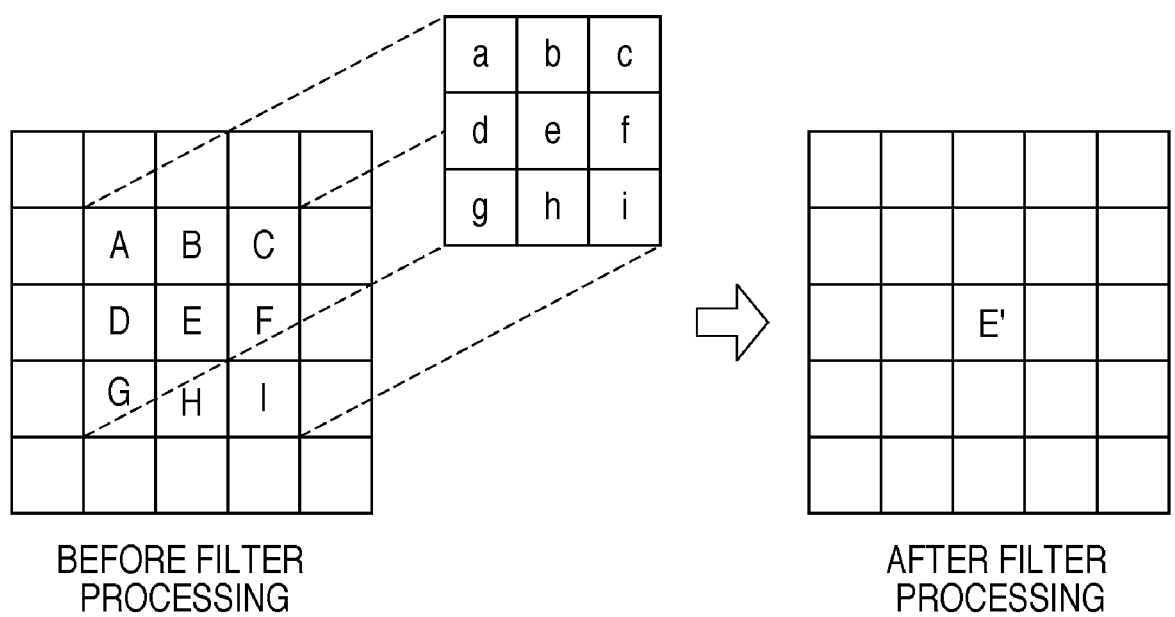
FIG. 7 is a view for explaining filter processing.

FIG. 7 is a view for explaining filter processing.

Referring to FIG. 7, one cell represents one pixel. Let E be a pixel of interest, A to I be adjacent pixels, and a to i be filter set values. A pixel E' of interest after filter processing is given by equation (3).

$$E' = \frac{a \cdot A + b \cdot B + c \cdot C + d \cdot D + e \cdot E + f \cdot F + g \cdot G + h \cdot H + i \cdot I}{a+b+c+d+e+f+g+h+i} \quad (3)$$

Figures 8, 9:
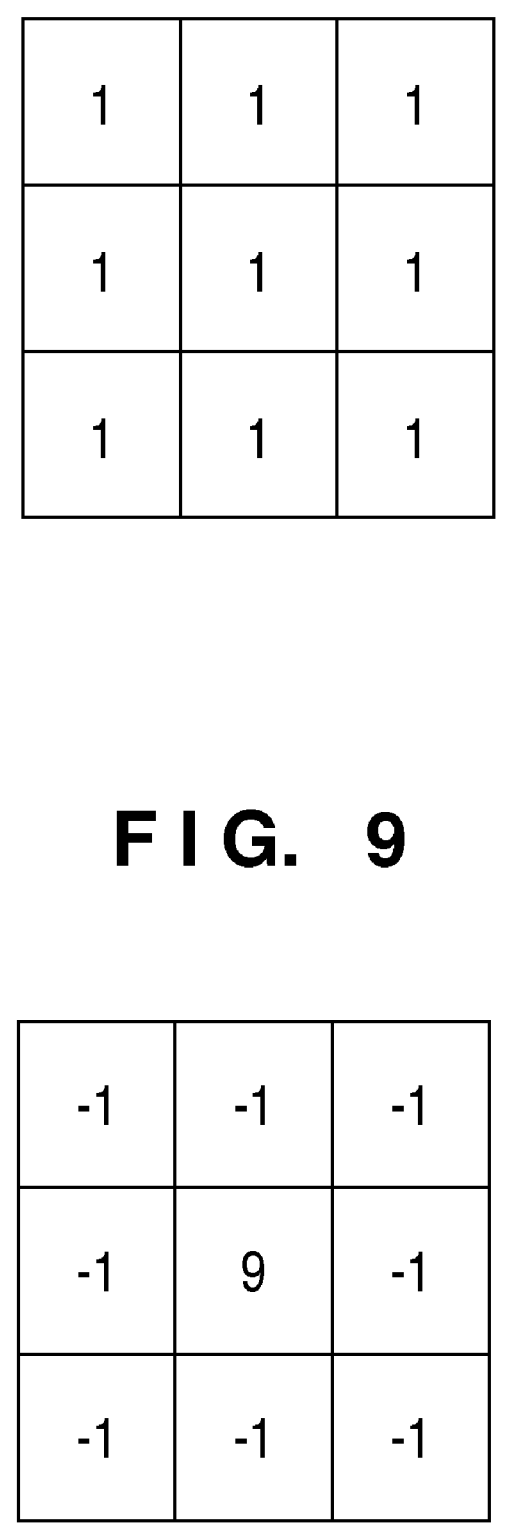

FIG. 8 is a view showing an example of set values in the filter of the filter processing unit 640.

When the set values shown in FIG. 8 are applied, the filter processing unit 640 functions as a low-pass filter. The low-pass filter can convert a read image into a smooth image by blurring its edges.

FIG. 9 is a view showing another example of set values in the filter of the filter processing unit 640.

When the set values shown in FIG. 9 are applied, the filter processing unit 640 functions as a high-pass filter. The high-pass filter can convert a read image into a sharp image by enhancing its edges.

In this embodiment, the filter set values are changed in accordance with the reading method to be used to read an image original.

Figure 10:
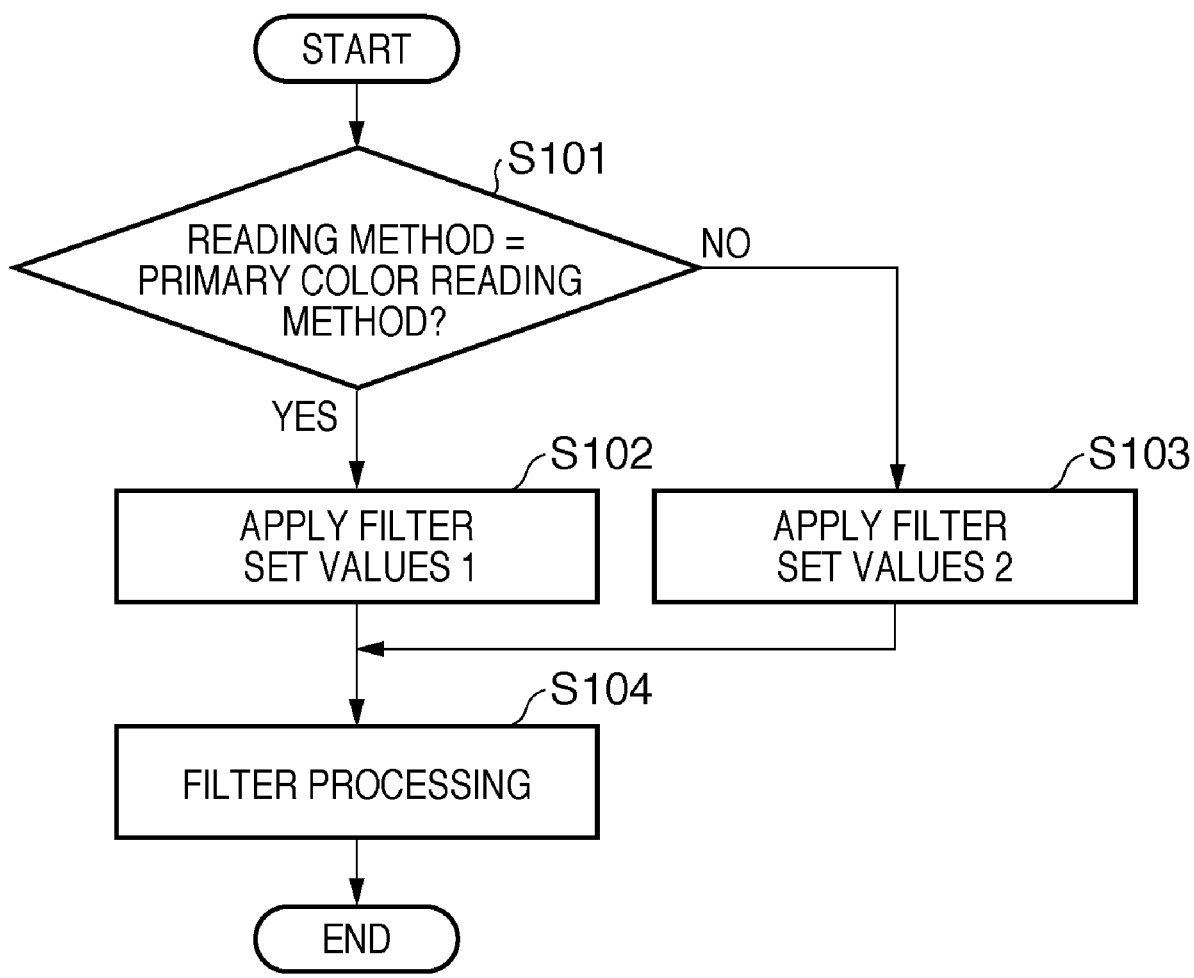
FIG. 10 is a flowchart illustrating processing of changing the filter set values depending on the reading method.
Figure 13:
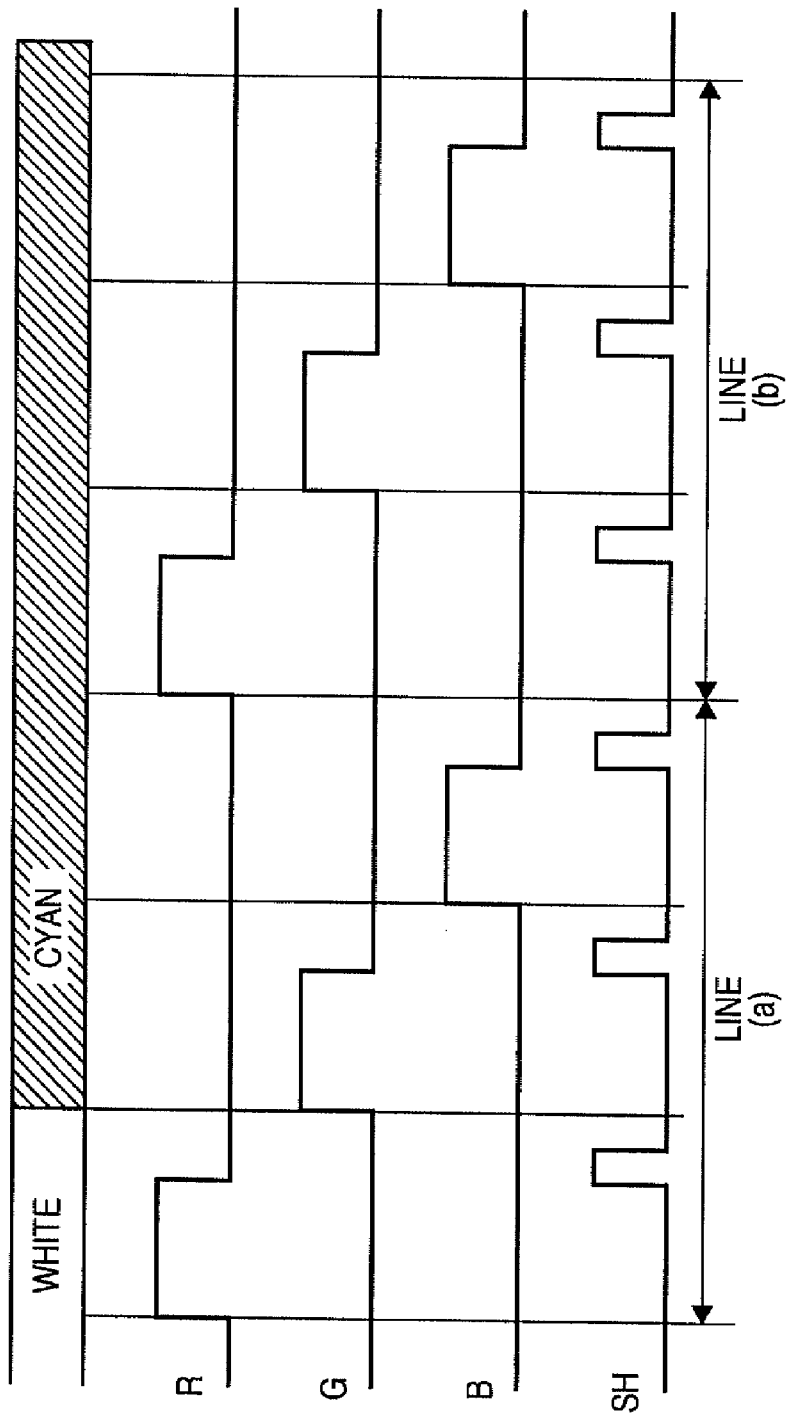
FIG. 13 is a timing chart showing a primary color reading method of reading an image original by turning on only one color LED at a single timing.
Figure 14:
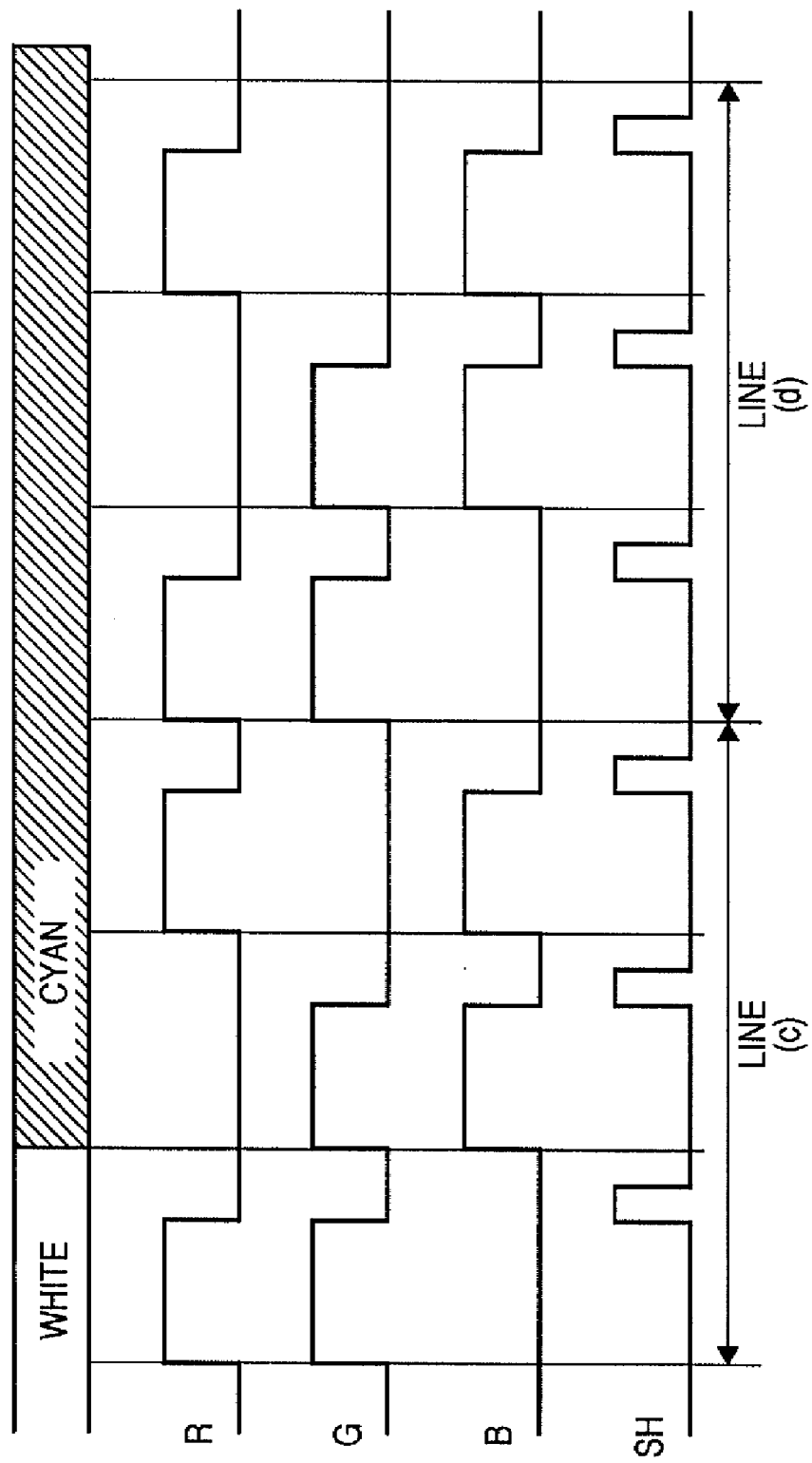
FIG. 14 is a timing chart showing a complementary color reading method of reading an image original by simultaneously turning on two color LEDs.
Figure 15:
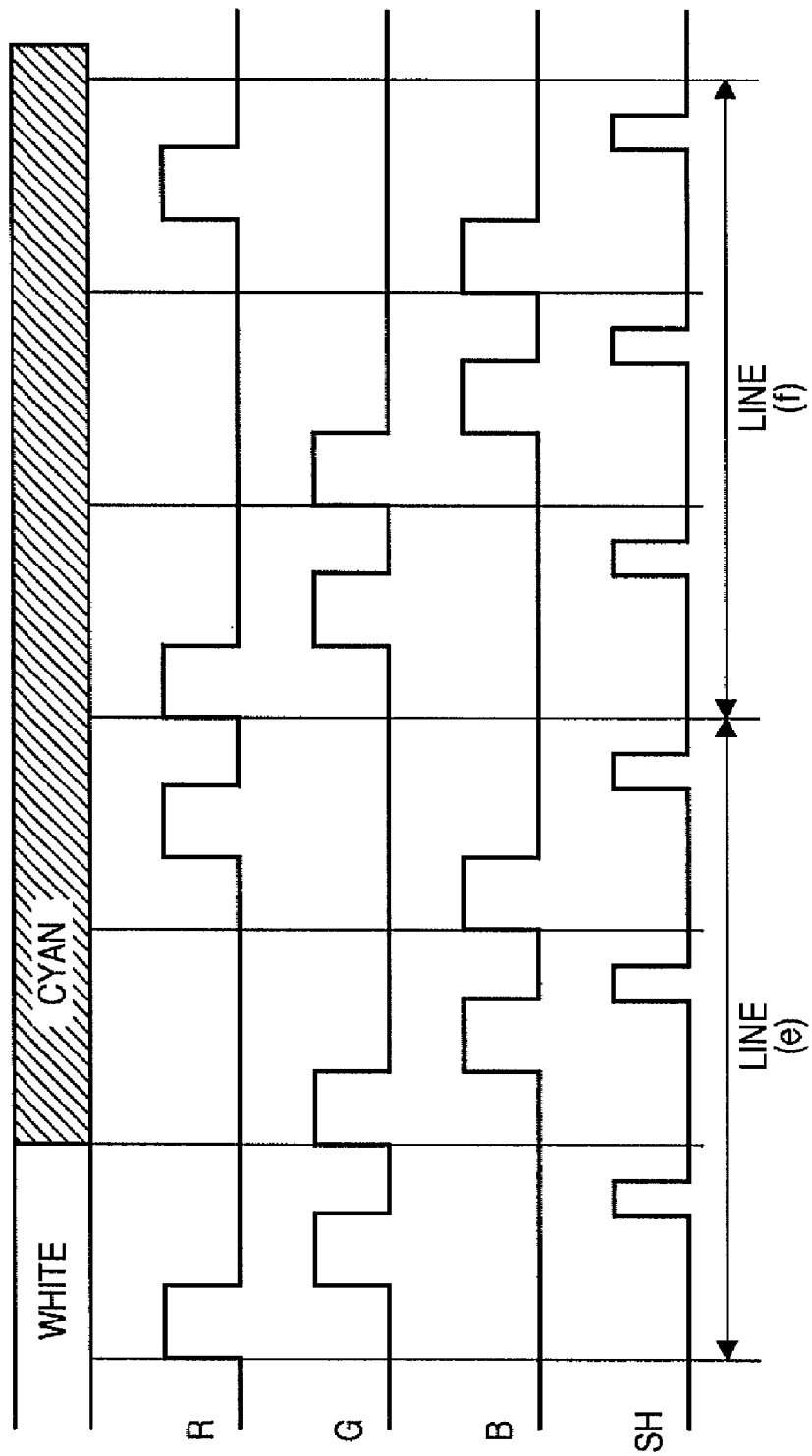
FIG. 15 is a timing chart showing a method of reading an image original using a two-color LED time-divisional lighting method.

FIG. 10 is a flowchart illustrating processing of changing the filter set values depending on the reading method.

In step S101, the type of the reading method to be used to read an image original is checked. In this process, it is checked whether the method is primary color reading or complementary color reading. If the reading method is primary color reading, the process advances to step S102. If the reading method is complementary color reading, the process advances to step S103.

In step S102, filter set values 1 are selected and applied to primary color reading. In step S103, filter set values 2 are selected and applied to complementary color reading.

Figures 11, 12:
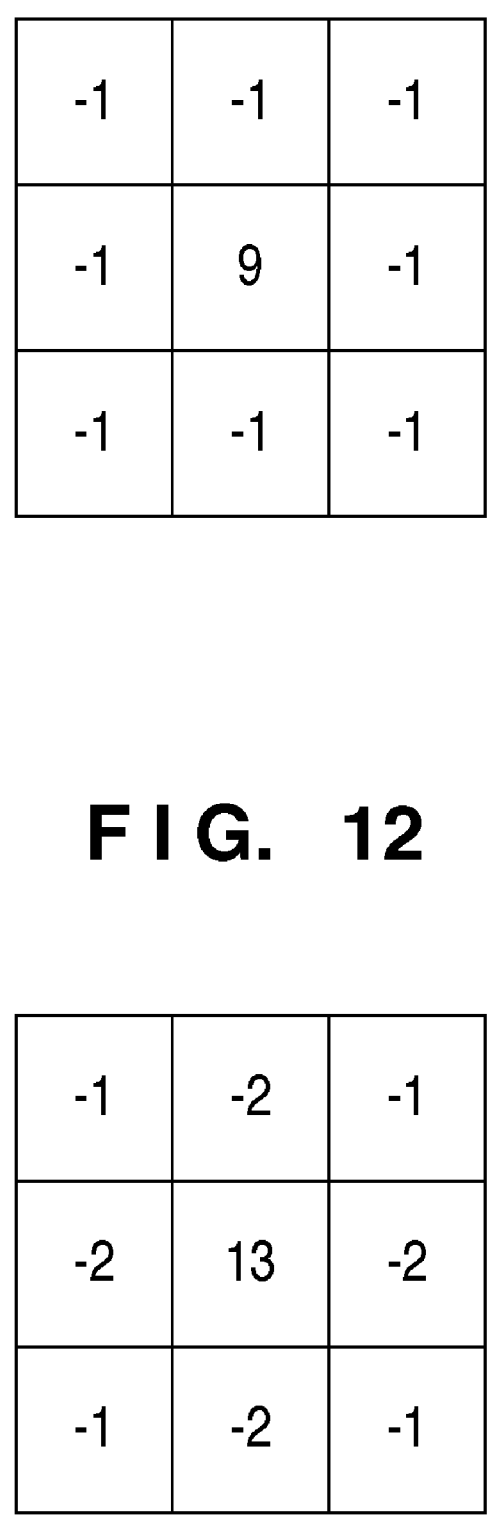

FIG. 11 is a view showing filter set values applied to primary color reading. FIG. 12 is a view showing filter set values applied to complementary color reading.

As is apparent from comparison between FIGS. 11 and 12, the edge reading reproducibility of complementary color reading is different from that of primary color reading. Hence, as can be seen from FIG. 12, the complementary color reading uses set values that achieve edge enhancement stronger than that achieved by the set values shown in FIG. 11.

In step S104, filter processing is performed for the image using the selected filter set values.

According to the above-described embodiment, it is possible to perform optimum filter processing in accordance with the reading method to be used to read an image original.

In the above-described embodiment, the filter size is 3×3 pixels. However, the present invention is not limited to this. For example, the filter size may be M×N pixels, where M and N are respectively positive integer, and 3 or more. The filter coefficient set values are not limited to the above-described examples, either.

In the above-described embodiments, it is possible to increase the printing density and resolution particularly using, of inkjet printing methods, a method of changing the ink state by heat energy generated by a means (e.g., electro-thermal transducer) for generating heat energy for ink discharge.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-331069, filed Dec. 21, 2007, which is hereby incorporated by reference herein in its entirety.

What is claimed is:

1. An image reading apparatus which irradiates an image original with light, receives reflected light of the light, and reads the image original based on the received light, the apparatus comprising:

light emitting means for respectively emitting light components of three primary colors;

a line image sensor including light receiving means for receiving the light reflected by the image original irradiated with the light emitting means;

lighting control means for controlling the light emitting means to read the image original using one of primary color reading performed by causing the light emitting means to line-sequentially irradiate the image original with the light components of three primary colors and read the image original while moving the line image sensor, and complementary color reading performed by causing the light emitting means to line-sequentially irradiate the image original with one of three different color combinations, which simultaneously includes two of the light components of three primary colors, and read the image original while moving the line image sensor; and image processing means for changing a filter to be used for image processing of image data obtained based on the reflected light received by the light receiving means, depending on whether line sequential reading of the image original is the primary color reading or the complementary color reading, and processing the image data, wherein a first filter used for image processing in the complementary color reading has a filter set value higher than a second filter set value of a second filter used for image processing in the primary color reading.

2. The apparatus according to claim 1, wherein the light emitting means includes a red LED, a green LED, and a blue LED.

3. The apparatus according to claim 1, further comprising a memory which stores data of the filter.

4. The apparatus according to claim 1, wherein a size of the filter is 3×3 pixels.

5. A multifunctional printer comprising: the image reading apparatus according to claim 1; and print means for printing an image on a printing medium based on one of externally input image data and image data representing an image read by the image reading apparatus.

6. An image processing method, in an image reading apparatus which irradiates an image original with light from light emitting means for emitting light components of three primary colors, receives reflected light of the light while moving a line image sensor including light receiving means, and image processes image data obtained based on the received light, the method comprising:

a reading step of reading the image original using one of primary color reading performed by causing the light emitting means to line-sequentially irradiate the image original with the light components of three primary colors, and complementary color reading performed by causing the light emitting means to line-sequentially irradiate the image original with one of three different color combinations, which simultaneously includes two of the light components of three primary colors; and an image processing step of changing a filter to be used for image processing of image data obtained based on the reflected light received by the light receiving means, depending on whether reading of the image original is the complementary color reading, and processing the image data, wherein a first filter used for image processing in the complementary color reading has a filter set value higher than a second filter set value of a second filter used for image processing in the primary color reading.

* * * * *